United States Patent
Wagner (10) Patent No.: US 8,196,736 B2
(45) Date of Patent: Jun. 12, 2012

(54) ROLLER ARRANGEMENT FOR CONVEYOR

(75) Inventor: Ronald G. Wagner, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 335 days.

(21) Appl. No.: 11/853,387

(22) Filed: Sep. 11, 2007

(65) Prior Publication Data

US 2009/0107809 A1    Apr. 30, 2009

(51) Int. Cl.
- *B65G 47/26* (2006.01)
- *B65G 13/06* (2006.01)
- *B65G 13/07* (2006.01)
- *B65G 13/08* (2006.01)
- *B65G 15/02* (2006.01)
- *B65G 21/16* (2006.01)

(52) U.S. Cl. ........... 198/781.1; 198/457.02; 198/781.04; 198/790; 198/787; 198/831

(58) Field of Classification Search ............. 198/457.02, 198/781.04, 790, 787, 781.1, 831
See application file for complete search history.

(56) References Cited

U.S. PATENT DOCUMENTS

| | | | |
|---|---|---|---|
| 3,176,828 A * | 4/1965 | Sullivan | 198/783 |
| 3,420,356 A | 1/1969 | De Good | |
| 3,643,788 A | 2/1972 | Werntz | |
| 3,724,642 A | 4/1973 | De Good | |
| 3,810,538 A | 5/1974 | Moyes | |
| 3,958,684 A * | 5/1976 | Garzelloni | 198/782 |
| 3,967,718 A | 7/1976 | Monahan | |
| 4,269,305 A | 5/1981 | Fryatt | |
| 4,318,468 A | 3/1982 | Bodewes et al. | |
| 4,353,458 A | 10/1982 | Saur | |
| 4,361,224 A | 11/1982 | Bowman | |
| 4,362,238 A | 12/1982 | Rivette | |
| 4,383,605 A | 5/1983 | Harwick | |
| 4,502,593 A | 3/1985 | van den Goor | |
| 4,609,098 A | 9/1986 | Morgan et al. | |
| 4,854,445 A | 8/1989 | Eaton et al. | |
| 4,958,723 A | 9/1990 | Bonifer et al. | |
| 5,005,693 A | 4/1991 | Fultz et al. | |
| 5,060,785 A | 10/1991 | Garrity | |
| 5,086,910 A | 2/1992 | Terpstra | |
| 5,582,286 A | 12/1996 | Kalm et al. | |
| 6,065,588 A | 5/2000 | Cotter et al. | |
| 6,161,681 A | 12/2000 | Kalm | |
| 6,478,142 B2 | 11/2002 | Cotter et al. | |
| 6,814,222 B2 | 11/2004 | Henson et al. | |
| 2003/0141170 A1 | 7/2003 | Yamashita et al. | |
| 2003/0209410 A1 | 11/2003 | Itoh et al. | |
| 2004/0222070 A1 * | 11/2004 | Neiser et al. | 198/781.1 |
| 2006/0076216 A1 * | 4/2006 | Wagner et al. | 198/790 |
| 2006/0086593 A1 | 4/2006 | Brown et al. | |

* cited by examiner

Primary Examiner — Gene Crawford
Assistant Examiner — Yolanda Jones
(74) Attorney, Agent, or Firm — Frost Brown Todd LLC (57) ABSTRACT

A roller conveyor includes a drive member whose path and the end of the overlying portions of the rollers sortation conveyor is configured to avoid substantial contact between certain rollers and the drive member. The roller conveyor is depicted in an embodiment as an accumulation conveyor with skewed roller sections.

6 Claims, 8 Drawing Sheets

ROLLER ARRANGEMENT FOR CONVEYOR

TECHNICAL FIELD

The present invention relates generally to conveyors, and more particularly to roller arrangements for conveyors. The invention will be disclosed in connection with, but not necessarily limited to, a conveyor having a plurality of driven skewed rollers.

BACKGROUND

Live roller conveyors are well-known. A belt driven liver roller conveyor typically has a belt that runs in a straight path, generally parallel to the direction of movement of product advanced by the upper conveying surface. The moving belt typically frictionally engages the rollers generally tangential to the rollers' lower edges, causing the rollers to rotate about their respective axes so as to advance product. In some instances it is desired to move product toward a particular side of the conveyor, in which case the rollers may be skewed, i.e., disposed non-perpendicularly to the longitudinal direction of travel of the conveyor. Typically, this places the rollers at an angle relative to the drive belt. When rollers, such as skewed rollers, contact a drive belt at an angle, force is imparted to the belt which urges the belt from its path. This can cause the belt to move off track, or otherwise harm conveyor components.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Reference will now be made in detail to the present preferred embodiment of the invention, an example of which is illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Figure 1:
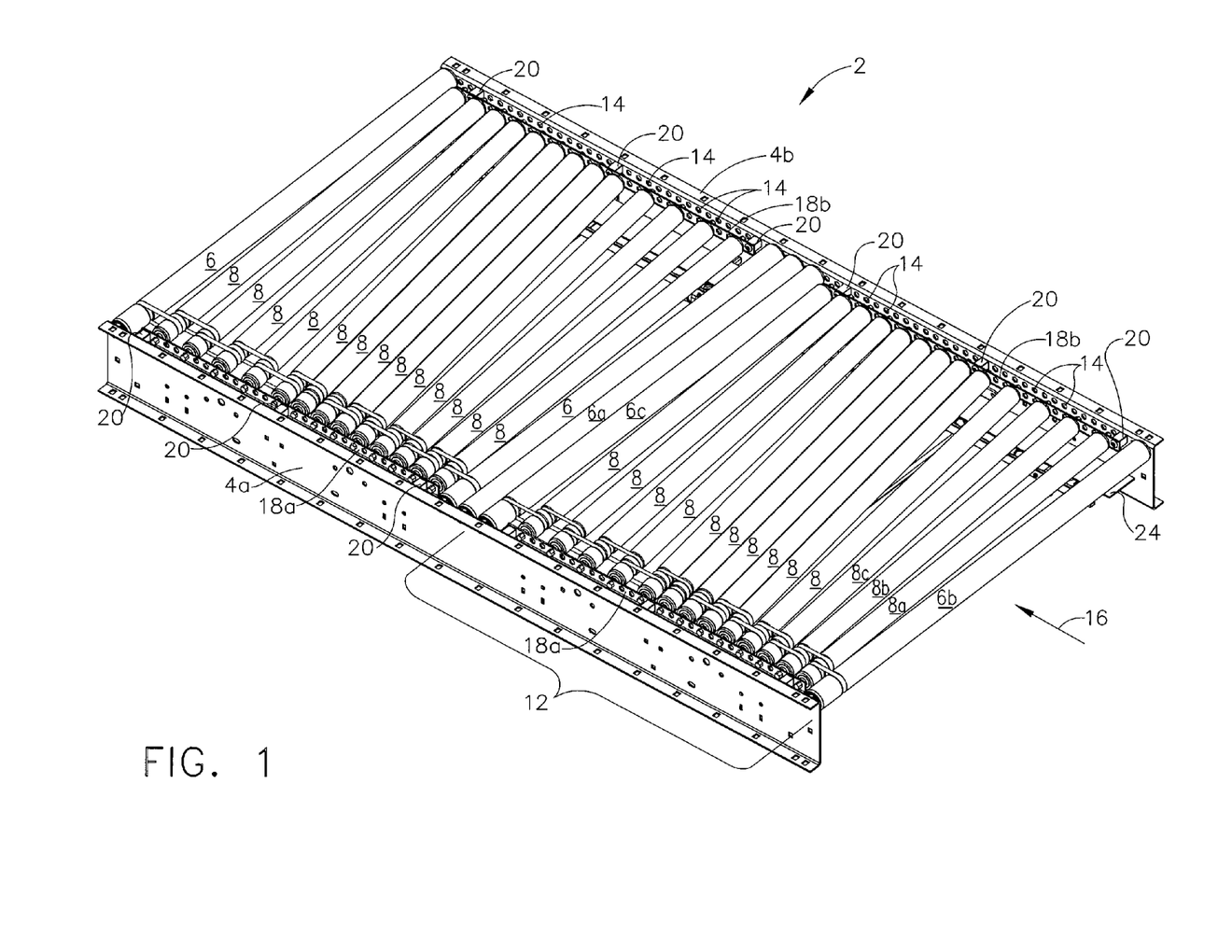
FIG. 1 is a perspective view of a conveyor embodying the teachings of the present invention.
Figure 2:
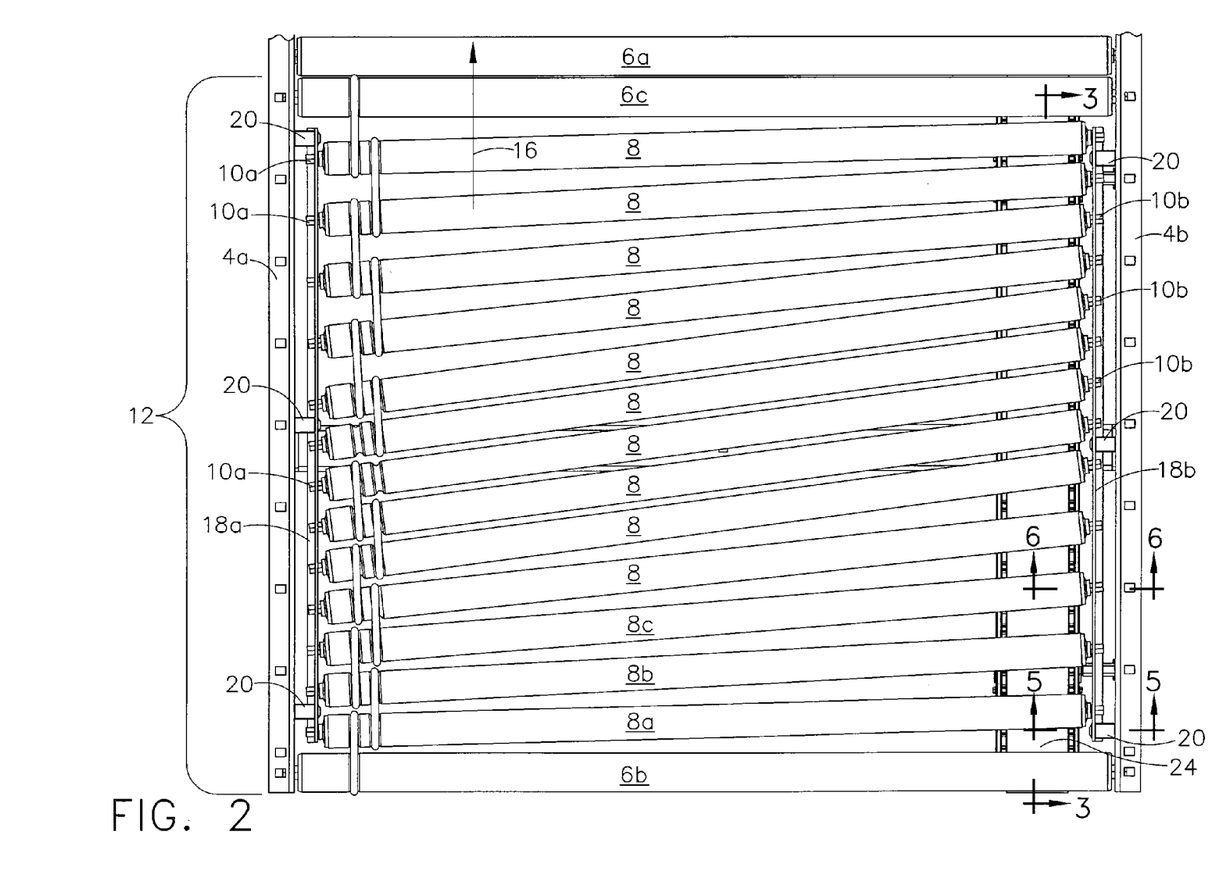
FIG. 2 is a top view of a portion of the conveyor illustrated in FIG. 1.

Referring to FIGS. 1 and 2, conveyor 2 is illustrated as a belt driven live roller accumulation conveyor, although the present invention as described and as claimed is not limited thereto. Conveyor 2 includes a pair of spaced apart generally parallel frame rails 4a and 4b, which carry a plurality of conveyor rollers 6 and 8. Although frame rails 4a and 4b are illustrated as generally straight, the teachings of the present invention may be practiced with curved frame rails conveying articles in a downstream direction. It is noted that conveyor 2 may represent a section of a larger conveyor, and that multiple such sections may be connected together, directly, or with conveyor sections of other configurations interposed therebetween.

Rollers 8 are illustrated as skewed rollers, although the practice of the teachings of this invention is not limited thereto. As is well known, each roller 6 and 8 is freely rotatable about its axis of rotation, supported by supporting ends 10a and 10b, which are illustrated as axles extending from either end. Any configuration of supporting end/any configuration of axle may be used with this invention.

As can be seen, the FIG. 1 illustrates conveyor 2 with two essentially identical successive pluralities of rollers 6 and 8, with roller 6a disposed in between the two pluralities. Roller 6a may be omitted as it is not necessary to the practice of the teachings of this invention, as well as additional perpendicular rollers could be included adjacent roller 6a. FIG. 2 illustrates a fragmentary portion of conveyor 2 having one of those two pluralities, upstream plurality 12.

As seen in FIG. 1 frame rails 4a and 4b include a plurality of spaced apart openings 14 which are shaped complementarily to supporting ends 10a and 10b of at least rollers 6. As seen in FIGS. 1 and 2, supporting ends 10a and 10b of rollers 6 are disposed in selected openings 14, perpendicular to the downstream direction as indicated by arrow 16. In the depicted embodiment, openings 14 are formed on 1" centers, a dimension smaller than the minimum center to center distance of the rollers. As is known, the multitude of openings 14 in frame rails 4a and 4b allow rollers to be located as needed in the appropriate position.

Figure 4:
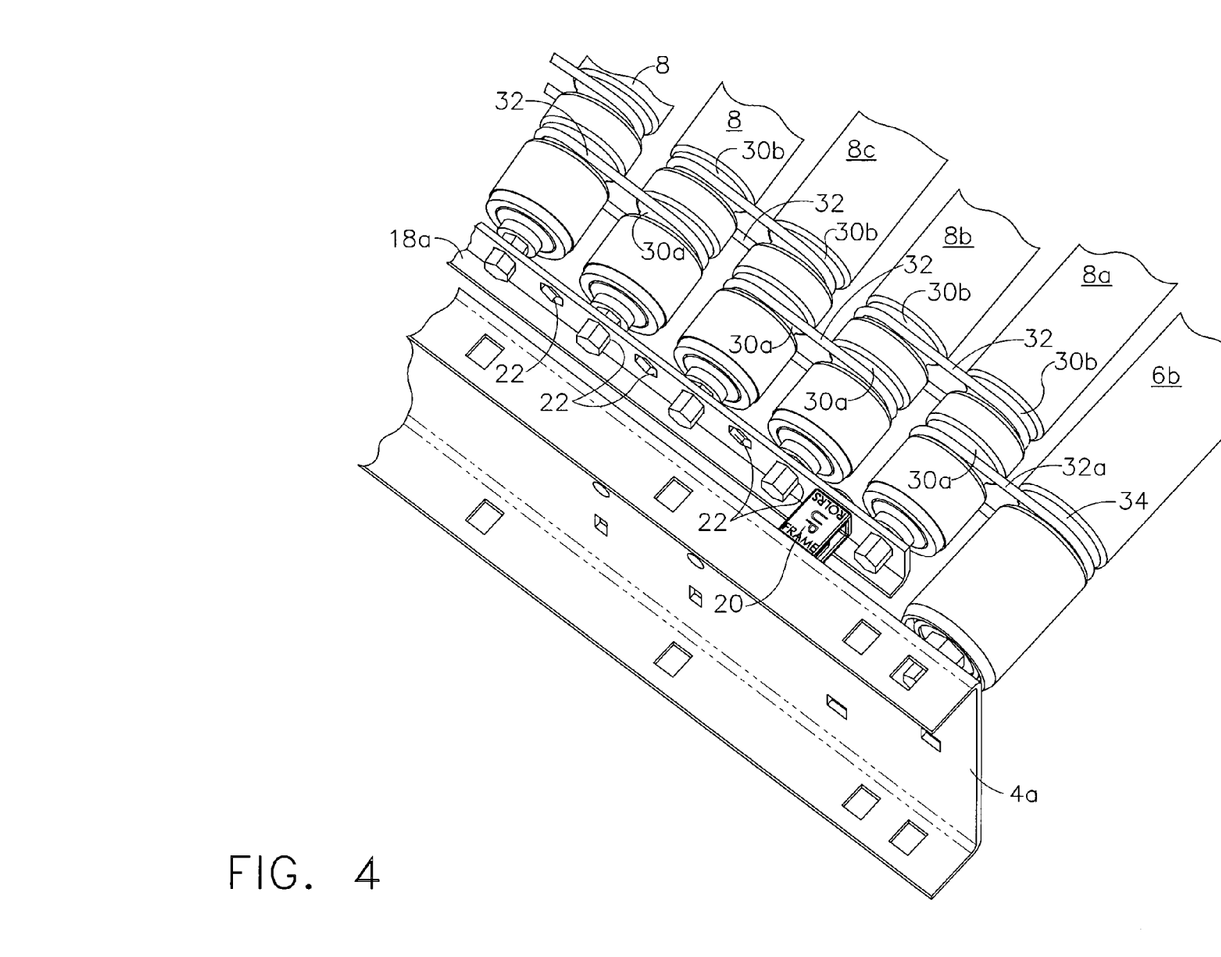
FIG. 4 is an enlarged, fragmentary perspective view of the lower right corner of the conveyor of FIG. 1.

As can be seen in FIGS. 1 and 2, frame rail 4a carries first roller support 18a and frame rail 4b carries second roller support 18b. Since the configuration of both roller supports 18a and 18b are mirror images of each other, reference will be made to first roller support 18a. Referring also to FIG. 4, first roller support 18a is spaced apart from first frame rail 4a by a plurality of spacers 20. Support rollers 18a and 18b include a plurality of spaced apart openings 22 which are shaped complementarily to supporting ends 10a and 10b of at least rollers 8. As can be seen, rollers 8 are shorter than rollers 6 so as to be disposed in-between roller supports 18a and 18b. Such inward spacing from the frame rails of a structure to support rollers may be used alone, separate from the other teachings of the present invention, or in combination with other selected aspects of the present invention.

In the embodiment depicted, rollers 8 are skewed, being disposed non-perpendicularly to the direction of travel. The multitude of openings 22 allow rollers 8 to be skewed as needed to fan rollers 8 out from adjacent perpendicular roller 6 to the full amount of the skew of rollers 8, and then to fan rollers 8 back toward the perpendicular roller 6 at the exit of a skew section.

Figure 3:
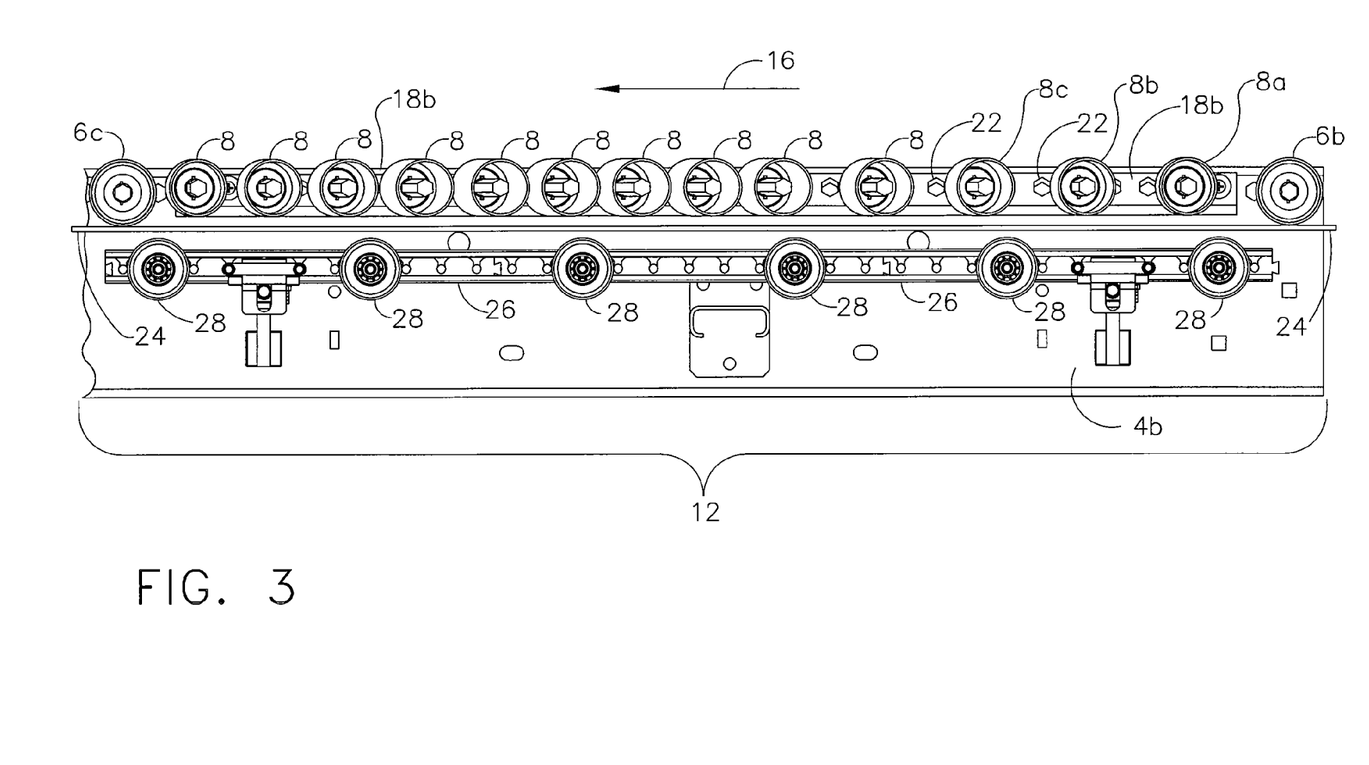
FIG. 3 is a cross section view taken along line 3-3 of FIG. 2.

Drive member 24 is disposed adjacent and overlying portions of rollers 6 and 8. In the depicted embodiment, conveyor 2 may be an accumulation conveyor with drive member 14 being selectively engageable with at least one of rollers 6 within a skew section, although in other applications drive member may be engaged with one or more of rollers 6 full time. Referring to FIG. 3, which is a cross section of conveyor 2 taken along line 3-3 of FIG. 2, the upper tangents of rollers 6 and 8 define a conveying surface, which is at least part of the conveying surface of a conveyor section or module, or the conveying surface of a larger, even entire conveyor. Plurality 12 of rollers 6, 8, includes at least one roller 6 which has nominal diameter larger than the rest of the rollers of plurality 12. In the depicted embodiment, rollers 8 have the same general nominal diameter, and comprise a plurality of plurality 12 with each roller thereof having a nominal diameter smaller than that of roller 6. In the depicted embodiment, the nominal diameter of rollers 6 was 1.9 inches, and the nominal diameter of rollers 8 was 1.625 inches, although any suitable diameters may be selected.

Figure 5:
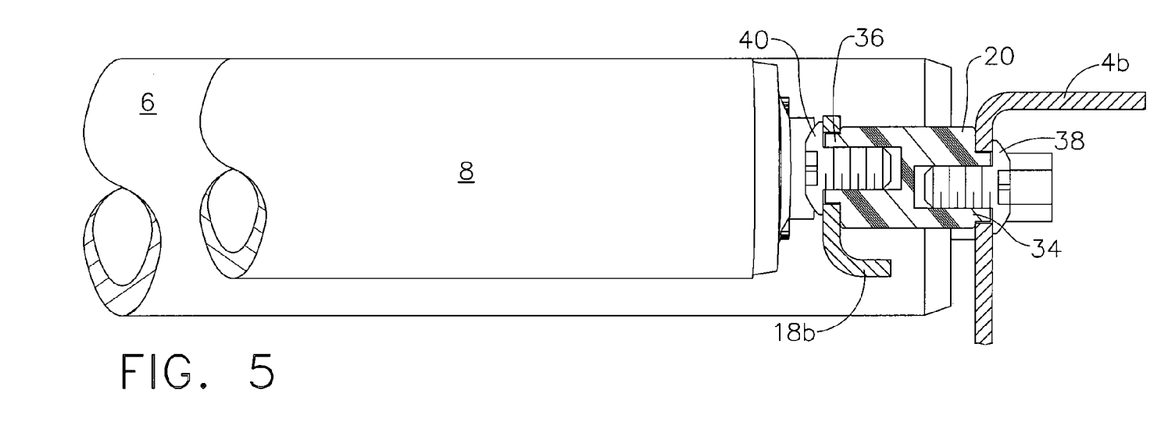
FIG. 5 is an enlarged, fragmentary cross section view taken along line 5-5 of FIG. 2.

Referring also to FIG. 5, in order to present a generally planar conveying surface with the use of rollers 6, 8 that have different nominal diameters, the center of axis of rotation of the smaller diameter rollers, rollers 8, must be higher than the center of the axis of rotation of the larger diameter rollers, rollers 6. This is accomplished by the offset of spacers 20, as described below.

Returning to FIG. 3, the combination of the generally planer upper conveying surface and the difference in diameters results in the lower tangents of rollers 8 being higher than the lower tangents of rollers 6. This differences allows for no substantial contact between rollers 8 and drive member 24 to exist. In FIG. 3, accumulator actuator 26, which in the depicted embodiment is illustrated similar in construction and operation to the accumulator actuator described in U.S. Pat. No. 6,889,822, which is incorporated herein by reference, includes a plurality of actuator rollers 28 that urge drive member 24 into a path that engages the larger diameter rollers 6, but does not substantially engage the smaller diameter rollers 8. Thus, there is no substantial force produced between rollers 8 and drive member 24. When rollers 8 are skewed, as in the depicted embodiment, no force is imparted to drive member 24 which urges drive member 24 from its path.

It is noted that in FIG. 3, drive member 24 is depicted raised from actuation rollers 28, with accumulator actuator 26 being in the non-actuated position. Drive member 24 would not normally be in such a position without actuation of accumulator actuator 26.

It is also noted that drive member 24 may extend to underlie many conveyor sections as a continuous member.

Thus, the path of drive member 24 and the adjacent portions of rollers 8 are configured such that there is not substantial contact between the adjacent portions and drive member 24. There are many configurations other than that illustrated in the depicted embodiment which meet this aspect of the present invention. For example, rollers 8 could have a stepped diameter, with the large diameter matching the diameter of rollers 6, and a stepped down diameter small enough such that there is no substantial contact between the stepped diameter portion and drive member 24, when drive member is urged into contact with rollers 6. In such a case, the upper tangent of the stepped down diameter would not necessarily define a portion of the conveying surface, but the large diameter would. Another alternative configuration could involve the use of path defining rollers overlying the drive member and located so as to cause the drive member to follow a serpentine path when the drive member is urged toward contact with the rollers, thereby preventing substantial contact between a group of rollers, such as skewed rollers, and the drive member while at the same time allowing substantial contact between another group of rollers, such as the perpendicular rollers, and the drive member.

Referring to FIG. 4, since the plurality of rollers 8 which do not substantially contact drive member 24, no force nor rotation is transmitted to rollers 8 direction by drive member 24. In order to provide rotation to rollers 8 in the depicted embodiment, rollers 8 have grooves 30a and 30b within which individual drive elements 32, O-bands in the depicted embodiment, are disposed. Roller 6, which is powered by drive member 24, also includes groove 34 with drive element 32a disposed therein. With reference also to FIGS. 1 and 2, drive element 32 engages roller 6b and adjacent roller 8a, disposed in the aligned grooves 34 of roller 6b and groove 30a of roller 8a. Another drive element 32 is disposed in a different groove 30b of roller 8a and also engages roller 8b at groove 30b. This alternating pattern continues to other rollers 8. As seen in FIGS. 1 and 2, roller 6c, which is driven by drive member 24, also drives some of rollers 8. An alternative to driving rollers 8 by connecting them through drive elements 32 to a driven roller 6, one or more of rollers 8 could be a motorized drive roller, driving other rollers 8 through drive elements 32.

Figure 6:
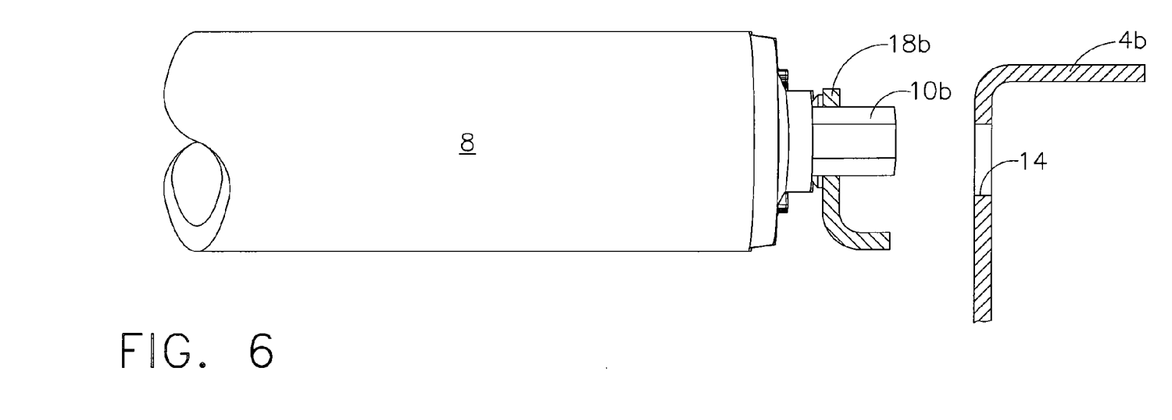
FIG. 6 is an enlarged, fragmentary cross section view taken along line 6-6 of FIG. 2.
Figure 7:
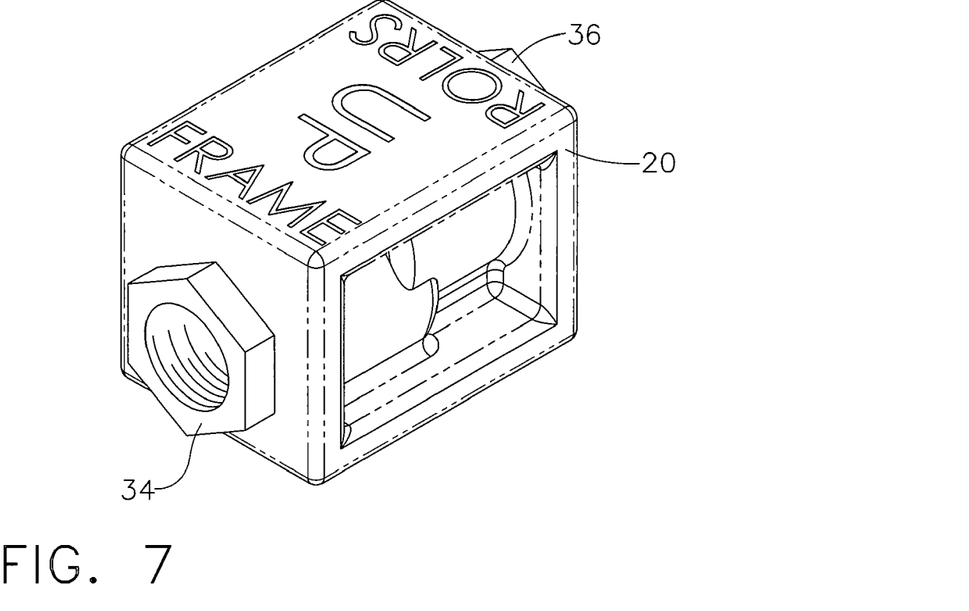
FIG. 7 is an enlarged perspective view of a spacer used in the conveyor illustrated in FIG. 1.
Figure 8:
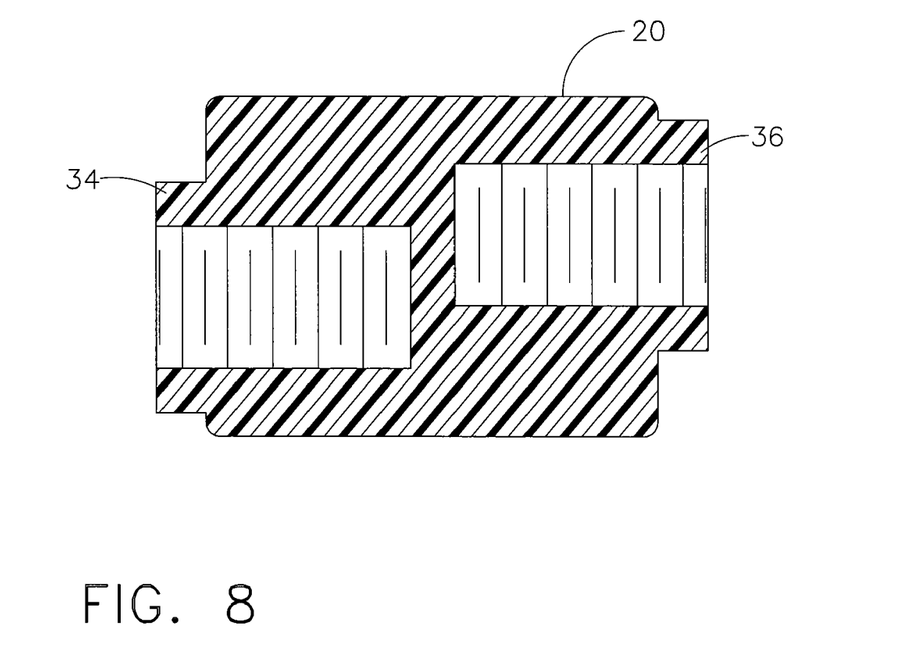
FIG. 8 is a cross section view of the spacer of FIG. 7 taken along the vertical midline of the spacer.

FIGS. 5 and 6 illustrate the relationship of rollers 6, rollers 8, roller supports 18b, spacers 20 and frame rails 10b. Space 20 can be of any suitable configuration and dimension. FIG. 5 is a cross section taken through spacer 20, illustrating the vertical offset between the axes of rotation of rollers 6 and rollers 8, and the spacing from roller support 18b from frame rail 10b. With reference also to FIGS. 7 and 8, in the embodiment depicted, spacer 20 includes boss 34 and boss 36. In the embodiment depicted, spacer 20 spaces roller supports 18 from frame rails 4 a distance of 1 inch, with the overall length of spacer 20 being 1.22 inches. The centerline of boss 34 is offset from the centerline of boss 36 a distance which place the upper tangents of rollers 6 and 8 at the same level. Boss 34 is shaped complementarily to opening 14, so as to be received by opening 14, and held there in place by fastener 38. Similarly, boss 36 is shaped complementarily to opening 33 of roller support 18b, and held by fastener 40. As seen in FIG. 7, spacer 20 may include indicia relating to proper installation.

Figure 9:
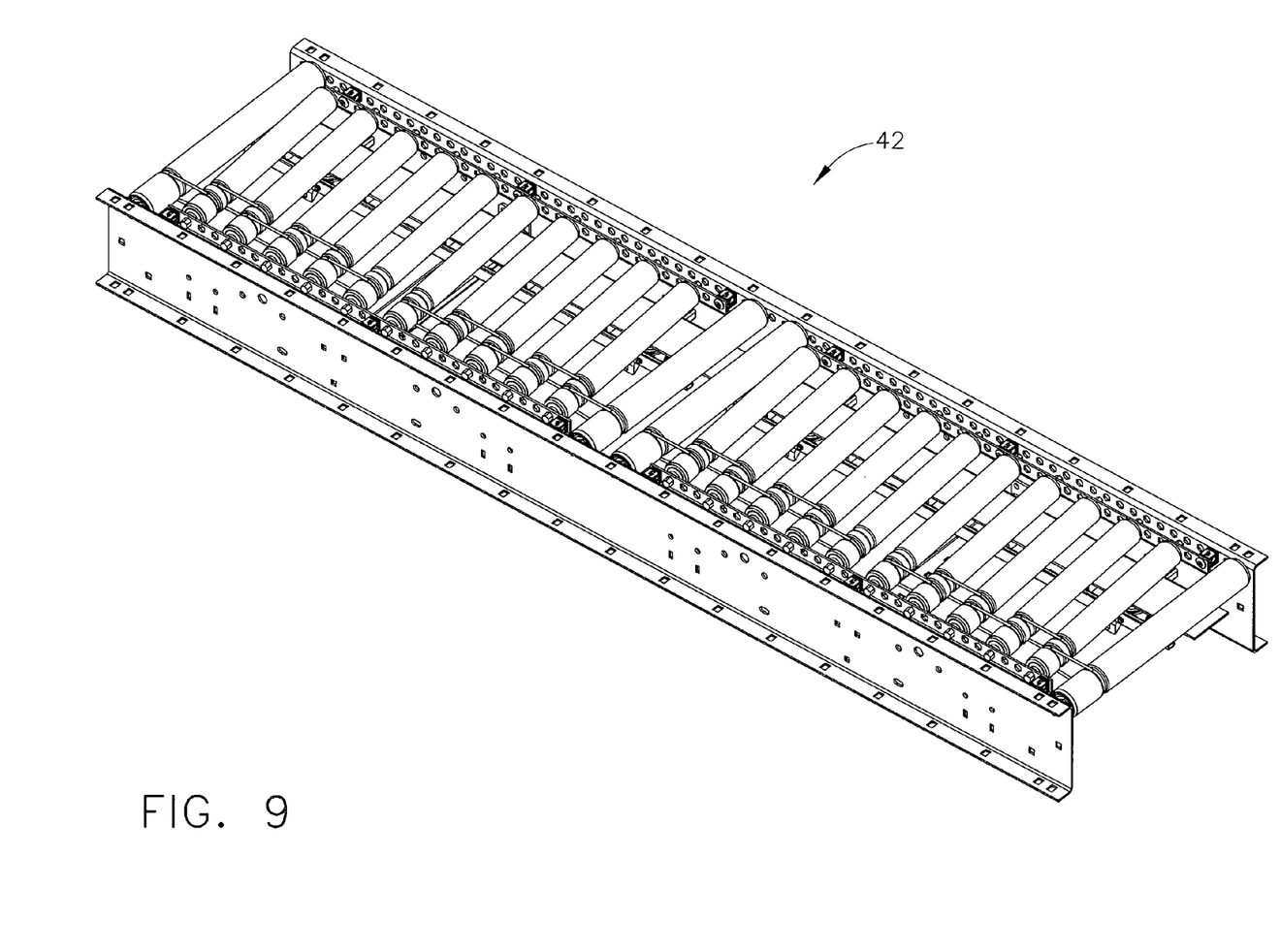
FIG. 9 is a perspective view of a conveyor embodying the teachings of the present invention, illustrating an alternate arrangement of rollers.
Figure 10:
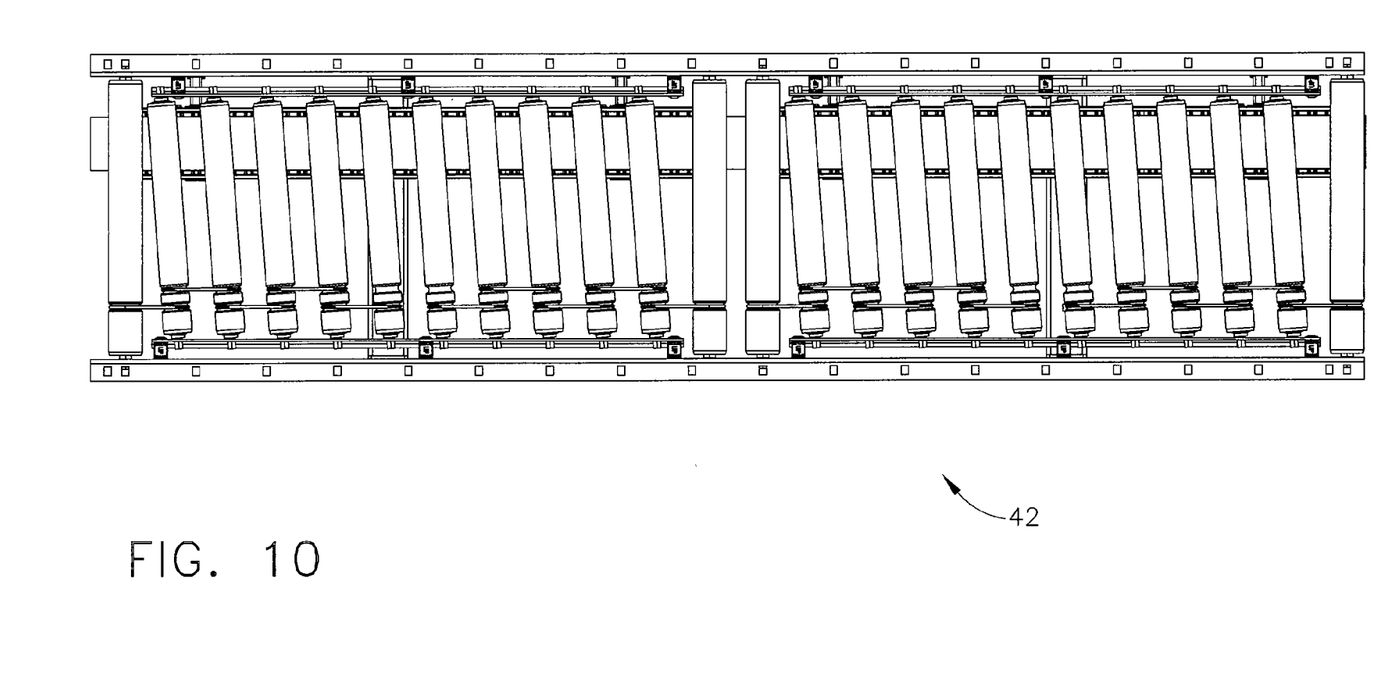
FIG. 10 is a top plan view of the conveyor of FIG. 9.

It is noted that the use of roller supports 18a and b provides installation flexibility and field retrofitability. Because the distance between roller supports 18a and 18b is smaller than the space between frame rails 4a and 4b, rollers 8 that are supported by roller supports 18a and 18b must be shorter than rollers 6 that are supported directly by frame rails 4a and 4b. An alternative to this configuration allows roller supports 18a and 18b to be omitted, if openings 22 are formed in frame rails 4a and 4b at the appropriate height and horizontal location to locate rollers 8 in the desired location. in the embodiment depicted, openings 22 are formed on 1 inch centers FIGS. 9 and 10 illustrate a differently dimensioned conveyor embodying the principles of the present invention. Conveyor 42 includes the same features as described above for conveyor 2 (e.g., frame rails with openings, roller supports with openings, spacers with offset, rollers with a larger diameter, rollers with a smaller diameter, drive member, drive elements). The rollers of conveyor 42 are illustrated being on 3 inch centers. In FIGS. 9 and 10, it is easier to see the components under the rollers easier in the perspective and plan views of FIGS. 9 and 10.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

The invention claimed is:

1. A conveyor configured to convey articles in a downstream direction along a generally planar conveying surface, said conveyor comprising:
   a. a first plurality of spaced apart conveyor rollers defining at least a first part of said conveying surface, each of said conveyor rollers having a length and an axis of rotation and two spaced apart ends, said conveyor rollers being disposed transverse to said downstream direction, each roller of said first plurality of spaced apart conveyor rollers having a respective first nominal diameter,
   b. a second plurality of spaced apart conveyor rollers interposed between at least two of said rollers of said first plurality of spaced apart conveyor rollers, each roller of said second plurality spaced apart conveyor rollers having a respective nominal diameter smaller than said first nominal diameter;
   c. a drive member underlying respective portions of said rollers of said first plurality of said spaced apart conveyor rollers and underlying respective portions of said rollers of second plurality of rollers spaced apart conveyor rollers, said drive member configured to selectively engage and rotate each of said rollers of said first plurality of spaced apart conveyor rollers, said respective nominal diameters of said respective portions of said rollers of said second plurality of rollers being dimensioned such that said drive member does not engage said rollers of said second plurality of rollers; and
   d. a plurality of drive elements, at least a first drive element of said plurality of drive elements disposed to engage at least a first roller of said first plurality of spaced apart conveyor rollers and at least a first roller of said second plurality of spaced apart conveyor rollers, at least a second drive element of said plurality of drive elements disposed to engage said at least a first roller of said second plurality of spaced apart conveyor rollers and at least a second roller of said second plurality of spaced apart conveyor rollers, such that rotation of said at least a first roller of said first plurality of spaced apart conveyor rollers drives said first and second rollers of said second plurality of spaced apart conveyor rollers.

2. The conveyor of claim 1, wherein said respective nominal diameter of at least one roller of said second plurality of rollers extends substantially the entire length of said at least one roller of said second plurality of rollers.

3. The conveyor of claim 1, wherein said respective nominal diameter of at least one roller of said second plurality of rollers extends less than the entire length of said at least one roller of said second plurality of rollers.

4. The conveyor of claim 3, wherein said respective nominal diameter of at least one roller of said second plurality of rollers is disposed overlying said drive member.

5. The conveyor of any one of claims 1 and 2-4 wherein said second plurality of rollers are skewed.

6. A conveyor configured to convey articles in a downstream direction along a generally planar conveying surface, said conveyor comprising:
   a. a first plurality of spaced apart conveyor rollers defining at least a first part of said conveying surface, each of said conveyor rollers having a length and an axis of rotation and two spaced apart ends, said conveyor rollers being disposed transverse to said downstream direction;
   b. a drive member underlying respective adjacent portions of rollers of said first plurality of spaced apart conveyor rollers, said drive member following a path wherein said path and said adjacent portions of a second plurality of rollers of said first plurality of spaced apart conveyor rollers are configured such that there is not substantial contact between said adjacent portions of said second plurality of rollers and said drive member and wherein said path and said adjacent portion of at least one driven roller of said first plurality of rollers are configured such that there is selectively substantially contact between said adjacent portion of said at least one driven roller and said drive member; and
   c. a plurality of drive elements respectively drivingly interconnecting the rollers of said second plurality of rollers and respectively drivingly connecting said at least one driven roller and said second plurality of rollers.

* * * * *